(No Model.) 2 Sheets—Sheet 1.
J. C. STEAD.
STEAM GENERATOR.
No. 263,615. Patented Aug. 29, 1882.
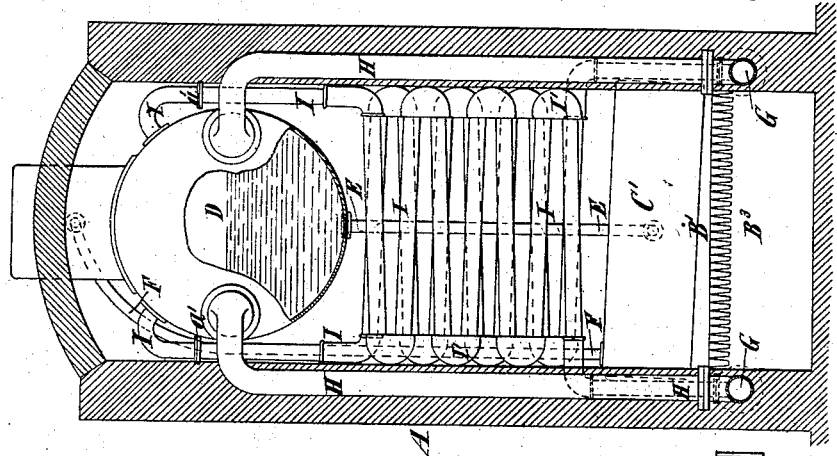
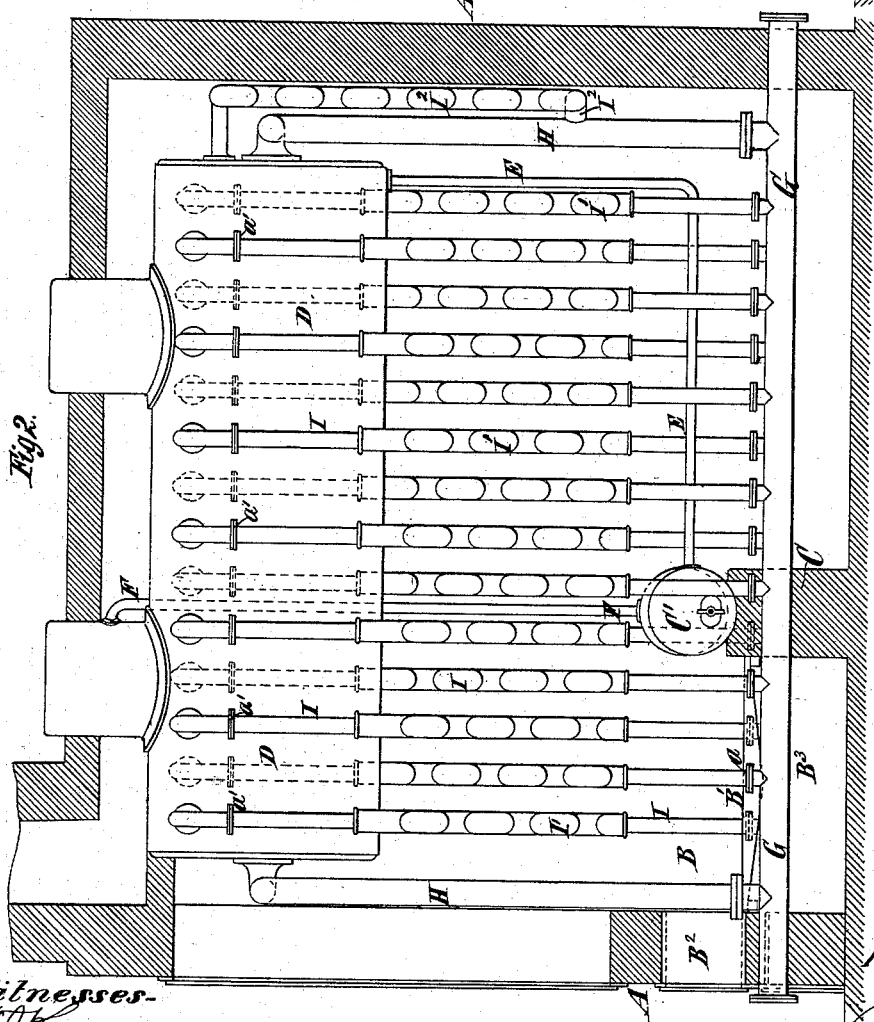
Witnesses—
Inventor—
J. C. Stead
By his atty
Edwin H. Brown (No Model.)
J. C. STEAD.
STEAM GENERATOR.
No. 263,615.   Patented Aug. 29, 1882.
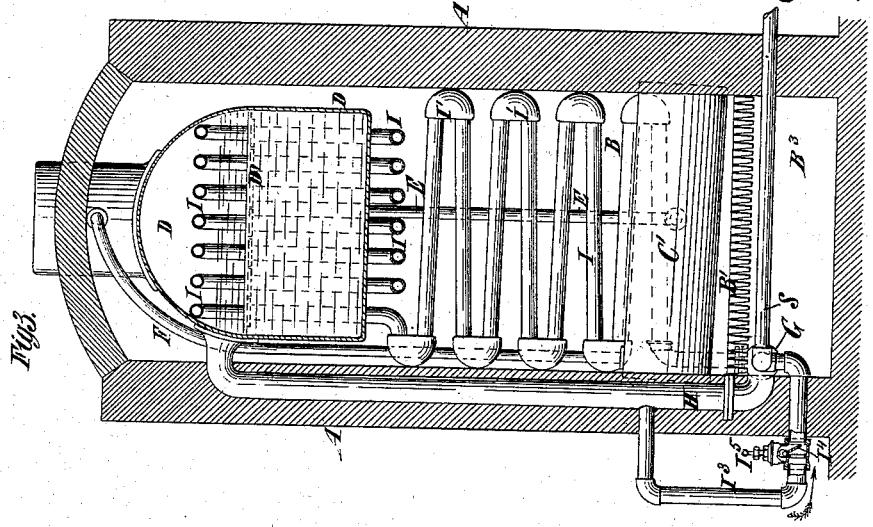
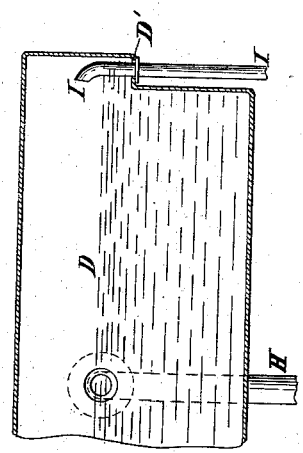
Witnesses-
J. A. Keane
James R. Bowen.
Inventor-
James C. Stead
By his Atty.
Edwin H. Brown

UNITED STATES PATENT OFFICE.

JAMES C. STEAD, OF BROOKLYN, NEW YORK.

STEAM-GENERATOR.

SPECIFICATION forming part of Letters Patent No. 263,615, dated August 29, 1882.

Application filed April 24, 1882. (No model.)

*To all whom it may concern:*

Be it known that I, JAMES C. STEAD, of Brooklyn, in Kings county, and the State of New York, have invented a certain new and useful Improvement in Steam-Generators, of which the following is a specification.

My improvement consists essentially in the combination, with a separator whereby the steam generated will be readily separated from the water, side walls between which the separator is arranged, and a header or headers in the lower part of the generator adjacent to the side wall or walls and parallel or approximately parallel with said separator, of a novel arrangement of circulating-pipes leading from the header or headers and communicating directly with the separator, as hereinafter more fully described.

It also consists in other combinations of parts, hereinafter particularly described and claimed.

In the accompanying drawings, Figure 1 represents a transverse section of a generator embodying my invention; Fig. 2 represents a side elevation of a generator with one of its side walls removed; Fig. 3 represents a transverse section of a generator of modified form, also embodying my invention; and Fig. 4 represents a longitudinal section of a portion of the separator shown in Fig. 3.

Similar letters of reference designate corresponding parts in all the figures.

A designates the walls of a generator, which may be constructed of masonry in the usual manner.

B designates the furnace; B', the grate thereof; B², the fire-door, and B³ the ash-pit.

C designates the bridge-wall, which is surmounted by or comprises a mud-drum, C', which extends transversely across the furnace and is set at an inclination, as shown in Fig. 1, so that the mud or sediment will be deposited at its lower end, while steam and the hotter water will flow toward its upper end. At the lower end the mud-drum is provided with a hand-hole for cleaning it, and it may also have a hand-hole at its higher end.

Referring now particularly to Figs. 1 and 2, D designates a device arranged over or in the upper part of the furnace, and which I term a "separator," because therein opportunity is afforded for the free separation of the steam from the water.

E designates a pipe leading from the rear end of the separator D, near the bottom, to the mud-drum C', as best shown in Fig. 2; and F designates a pipe leading from the higher end of the mud-drum and communicating directly with the separator above the water-line. The cooler water flows downward from the bottom of the separator D through the pipe E, carrying with it mud and sediment, which is deposited in the mud-drum C', and the hotter water and steam pass from the higher end of the mud-drum through the pipe F to the separator, wherein the water falls, while the steam rises into the upper part of the separator and into a steam-drum, if one is attached to the separator.

G designates headers, one of which is arranged on each side of the furnace just below or about on a level with the grate and parallel or approximately parallel with said separator. These headers may extend through the front and rear walls of the generator, and may have man-holes in their ends to enable them to be readily cleaned. The feed-pipe may be connected with one of these headers, and also blow-off pipes, if desirable.

H designates pipes leading downward from the separator D to the headers G, and, as here represented, the said pipes lead from each end of the separator to both headers. The pipes H lead from the separator D near or at the water-line, so that they will carry down all vegetable or mineral matters which are brought to the surface of the water by ebullition, and which seriously impede the separation of steam from the water. All such solid matters are finally deposited in the headers G.

I designates circulating-pipes leading from the headers G upward, and thence transversely across the furnace from side to side, with a gradual upward inclination to the under side of the separator, and thence upward on the side of the separator, with which they communicate directly above the water-line. The several lengths composing the pipes I may be connected at the ends by ordinary return-bends, I', or by returns having hand-holes opposite the ends of the pipes, so as to provide for more readily cleaning the pipes. In each pipe I there may be a flange-union, $a$, near the header G, and a similar union, $a'$, near the separator, and in this way I afford provision for detaching any one or more of the pipes when necessary for repairs or any other purpose; and if the ends of the pipes, from which the portions are disconnected are plugged up or stopped the use of the generator may be continued. While in operation there is a constant circulation of water down the pipes H to the headers G, and from the headers up through the pipes I to the separator, and as the pipes I deliver their contents into the separator the water falls and the steam rises to the upper part thereof. As clearly shown in Fig. 2, the inclined portions of each pipe I are opposite the spaces between the portions of adjacent pipes, and by these pipes the products of combustion rising and passing rearward from the furnace are intercepted in their course and are caused to travel circuitously among and around the pipes, thereby retarding their passage and exposing a large area of very effective heating-surface. As clearly represented in Fig. 1, the pipes I lead from each header G to the opposite side of the separator D, so that portions of the pipes in the same horizontal plane are inclined alternately in opposite directions.

Although I prefer to employ a header, G, on each side of the furnace and two series of circulating-pipes, I, it is obvious that the advantages accruing from my invention might be at least measurably secured by a single header and a single series of pipes.

A circulating-pipe, $I^2$, similar to the pipes I, may be arranged adjacent to the back wall of the generator, as shown in Fig. 2.

Referring now to Figs. 3 and 4, D designates a separator the upper part of which is extended at the rear end, as shown clearly in Fig. 4, so as to form an offset, D', which is just below the water-line. In this example of my invention the separator D is connected with the mud-drum C' by pipes E F, like those shown in Figs. 1 and 2, and I have represented a single header, G, in one side of the furnace, though a similar header might be arranged in the opposite side of the furnace, if desired.

H designates the pipe through which water passes downward from the separator to the header G, and I designates circulating-pipes which extend transversely to the separator, and through which water circulates upward. The pipes I extend across from one side to the other of the furnace, and are then carried transversely upward through the offset D' into the separator. The pipes I are continued upward within the separator far enough above the offset to carry the water above the water-line, as shown in Fig. 4, so that the steam may readily separate from the water.

$I^3$ designates a branch pipe extending from the pipe H and entering the end of the header G adjacent to the feed-pipe $s$. In the branch pipe $I^3$ is a valve, $I^4$, (shown in Fig. 3,) which is hinged to a stem, $I^5$, so that it may be swung open to allow water to flow in the direction of the arrow; but, when desirable, the said stem and valve may be drawn up, so as to permit water to flow in either direction. The water entering at the feed-pipe $s$ tends to induce a current downward through the branch pipe $I^3$ into the header G. The feed-water cannot ordinarily enter the branch pipe $I^3$ because of the valve $I^4$ closing against a current upward through said pipe. If a second header were used it would be connected with the separator D, or with another similar separator, by a pipe similar to the pipe H, and the branch pipe $I^3$ and valve $I^4$ might also be used in connection therewith. The branch pipe $I^3$ and valve $I^4$ might also be combined with the form of generator shown in Figs. 1 and 2.

What I claim as my invention, and desire to secure by Letters Patent, is—

1. The combination, in a steam-generator, of a separator, side walls between which the separator is arranged, a header or headers arranged parallel or approximately parallel with said separator adjacent to one or both side walls, and circulating-pipes extending separately from the header or headers to and fro across between the side walls transversely to and under the separator, and each communicating with the separator above the water-line, substantially as herein described.

2. The combination, with the separator D, the mud-drum C', and the header or headers G, of the pipes E F, connecting said separator with said mud-drum, the pipes H, leading from the separator at the water-line to the header or headers G, and the circulating-pipes I, extending transversely to the separator and communicating directly therewith, substantially as herein described.

3. The combination, with the separator D, header G, and pipe H, of the branch pipe $I^3$ and hinged valve $I^4$, all arranged and operating substantially as specified.

JAMES C. STEAD.

Witnesses:
EDWIN H. BROWN,
E. M. BROWN.